(12) United States Patent
McHann, Jr.

(10) Patent No.: US 9,049,103 B2
(45) Date of Patent: *Jun. 2, 2015

(54) GRID EVENT DETECTION

(71) Applicant: Landis+Gyr Technologies, LLC, Pequot Lakes, MN (US)

(72) Inventor: Stanley E. McHann, Jr., Crosslake, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,423

(22) Filed: Apr. 2, 2014

(65) Prior Publication Data

US 2014/0215064 A1 Jul. 31, 2014

Related U.S. Application Data

(63) Continuation of application No. 13/075,646, filed on Mar. 30, 2011, now Pat. No. 8,693,580.

(51) Int. Cl.
| | |
|---|---|
| *H04L 27/00* | (2006.01) |
| *H04L 12/26* | (2006.01) |
| *H02J 13/00* | (2006.01) |
| *H04B 3/54* | (2006.01) |

(52) U.S. Cl.
CPC .............. *H04L 43/04* (2013.01); *H02J 13/002* (2013.01); *H04B 3/542* (2013.01); *H04B 2203/5408* (2013.01); *H04B 2203/5458* (2013.01); *H02J 13/0024* (2013.01); *Y04S 40/121* (2013.01); *Y04S 40/122* (2013.01); *Y04S 40/146* (2013.01); *Y02E 60/7815* (2013.01); *Y02E 60/7892* (2013.01); *Y02E 60/7823* (2013.01)

(58) Field of Classification Search
CPC .... H02J 13/002; H02J 13/0024; H04B 3/542; H04B 2203/5408; H04B 2203/5458; H04L 43/04; Y04S 40/122; Y04S 40/146; Y04S 40/121; Y02E 60/7815; Y02E 60/7892; Y02E 60/7823
USPC ......................................................... 375/316
See application file for complete search history.

(56) References Cited

U.S. PATENT DOCUMENTS

| | | |
|---|---|---|
| 5,581,229 A | 12/1996 | Hunt |
| 6,154,488 A | 11/2000 | Hunt |
| 6,177,884 B1 | 1/2001 | Hunt et al. |
| 6,998,963 B2 | 2/2006 | Flen et al. |
| 7,102,490 B2 | 9/2006 | Flen et al. |

(Continued)

*Primary Examiner* — Juan A Torres
(74) *Attorney, Agent, or Firm* — Crawford Maunu PLLC

(57) ABSTRACT

Methods, systems, and apparatus, including computer programs encoded on a computer storage medium, for detecting grid events. In one aspect, a method includes receiving signal characteristic data that specify signal characteristic values for signals that are received over each of a plurality of communications channels of a power line communications network. A determination is made that the signal characteristic values for the signals that are received over at least one of the communications channels are outside of a baseline signal value range. An endpoint that communicates over the at least one communications channel is identified, and a determination is made that a set of the signal characteristic values for the identified endpoint matches one of a plurality a grid event signatures for the identified endpoint. Data that identify the endpoint and a particular grid event that is represented by the matched grid event signature are provided.

9 Claims, 5 Drawing Sheets

(56) References Cited

U.S. PATENT DOCUMENTS

| | | |
|---|---|---|
| 7,145,438 B2 | 12/2006 | Flen et al. |
| 7,180,412 B2 | 2/2007 | Bonicatto et al. |
| 7,184,861 B2 | 2/2007 | Petite |
| 7,209,840 B2 | 4/2007 | Petite et al. |
| 7,224,740 B2 | 5/2007 | Hunt |
| 7,236,765 B2 | 6/2007 | Bonicatto et al. |
| 7,346,463 B2 | 3/2008 | Petite et al. |
| 7,432,824 B2 | 10/2008 | Flen et al. |
| 7,443,313 B2 | 10/2008 | Davis et al. |
| 7,468,661 B2 | 12/2008 | Petite et al. |
| 7,606,298 B1 | 10/2009 | Weber, Jr. et al. |
| 7,609,784 B1 | 10/2009 | Heistermann |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 8,428,201 B1 | 4/2013 | McHann, Jr. et al. |
| 2003/0225893 A1 | 12/2003 | Roese et al. |
| 2005/0017847 A1 | 1/2005 | Bonicatto et al. |
| 2005/0020232 A1 | 1/2005 | Bonicatto et al. |
| 2005/0083925 A1* | 4/2005 | Bonicatto et al. ............. 370/389 |
| 2005/0227693 A1 | 10/2005 | Kong et al. |
| 2008/0165727 A1 | 7/2008 | Xiaoben et al. |
| 2008/0215268 A1 | 9/2008 | Bonicatto et al. |
| 2008/0304595 A1 | 12/2008 | Haug et al. |
| 2009/0184835 A1 | 7/2009 | Deaver, Sr. et al. |
| 2009/0187285 A1 | 7/2009 | Yaney et al. |
| 2010/0111199 A1 | 5/2010 | Sharma |
| 2010/0152910 A1 | 6/2010 | Taft |
| 2010/0238815 A1 | 9/2010 | Kohout et al. |
| 2011/0121952 A1 | 5/2011 | Bonicatto et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0039403 A1 | 2/2012 | Callaway, Jr. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |
| 2012/0182157 A1 | 7/2012 | Carr |

* cited by examiner

GRID EVENT DETECTION

BACKGROUND

This specification relates to detecting grid events.

Service providers utilize distributed networks to provide services to customers over large geographic areas. For example, communications companies utilize a distributed communications network to provide communications services to customers. Similarly, power companies utilize a network of power lines and meters to provide power to customers throughout a geographic region.

These service providers are dependent on proper operation of their respective networks to deliver services to the customers because operational problems in the network can result in lost revenue for the service provider. For example, the service provider may lose revenue based on an inability to provide service during a network outage. Therefore, when a network outage or other network event that disrupts service occurs, it is in the best interest of the service provider to identify the cause of the problem and correct the problem as soon as possible.

In many distributed networks, service providers first receive an indication that there is a problem with the network based on feedback from customers. For example, customers may call the service provider to report a network outage. Based on the information received from the customer, the service provider can take action to remedy the problem with the network. For example, a service provider may access endpoints in the network to retrieve additional information regarding the status of the network and/or dispatch workers to attempt to identify the problem.

While a service provider can remedy network outages and other network problems by accessing endpoints in the network and/or dispatching workers, the time and resources required to identify the cause of the outage or problem can result in significant loss of revenue for the service provider. Thus, if a service provider can reduce the time required to identify whether a problem exists in a network, or even prevent the problem before it occurs, the service provider can reduce lost revenue due to network outages and increase customer satisfaction.

SUMMARY

In general, one innovative aspect of the subject matter described in this specification can be embodied in methods that include the actions of receiving, by a data processing apparatus, signal characteristic data that specify signal characteristic values for signals that are received over each of a plurality of communications channels of a power line communications network; determining, by the data processing apparatus, that the signal characteristic values for the signals that are received over at least one of the communications channels are outside of a baseline signal value range; identifying an endpoint that communicates over the at least one communications channel; determining that a set of the signal characteristic values matches one of a plurality a grid event signatures for the identified endpoint, each of the grid event signatures being indicative of a particular grid event; and providing data that identify the endpoint and the particular grid event for the grid event signature that is matched by the set of monitored signal characteristics. Other embodiments of this aspect include corresponding systems, apparatus, and computer programs, configured to perform the actions of the methods, encoded on computer storage devices.

These and other embodiments can each optionally include one or more of the following features. Determining that the set of signal characteristic values matches one of a plurality of grid event signatures can include determining that the set of signal characteristic values matches a grid event signature for one of a capacitor bank failure, a power outage, or capacitor bank activation. Identifying an endpoint that communicates over the communications channel can include identifying an endpoint identifier for the endpoint that communicates over the communications channel, the endpoint identifier being identified from an index of endpoint identifiers for endpoints and communications channels over which each of the endpoints communicates.

Methods can further include one or more of the actions of accessing map data that specify geographic locations of endpoints; determining a geographic location of the identified endpoint based on the map data; identifying network elements that are within a threshold distance of the geographic location of the identified endpoint; and identifying a particular network element in the set of network elements that is contributing to the grid event, the identification being based on at least one of the location of the identified endpoint, the location of the particular network element, or the particular grid event.

Methods can further include the action of determining that one or more additional network elements in the set of network elements are also being affected by the particular grid event. Determining that one or more additional network elements are also being affected by the particular grid event can include for each of the one or more additional network elements: comparing a set of the signal characteristic values for the network element to the grid event signature for the particular grid event; and determining that the set of signal characteristic values match the grid event signature.

Methods can further include the action of providing data that cause presentation of a map interface that visually identifies a geographic location of the network element that is contributing to the particular grid event and a geographic location of the one or more additional network elements that are also being affected by the particular grid event.

Methods can further include the action of updating the map interface in response to determining a new network element has been determined to be one of the one or more additional network elements, the map interface being updated to visually identify the geographic location of the new network element.

Methods can further include one or more of the actions of receiving status data from a network element specifying a reported state of the network element; determining, based on the received signal characteristic values, that the status data from the network element are invalid; and providing data specifying an actual state of the network element.

Particular embodiments of the subject matter described in this specification can be implemented so as to realize one or more of the following advantages. A data processing apparatus can be configured to determine that a grid event exists and a location of a network element that is causing the grid event. The time required to determine that a grid event has occurred and/or the source of the grid event can be reduced by using characteristics of continually monitored communications signals to determine the existence of a grid event. The location of the network element that is causing the grid event can be determined using map data so that service personnel can be dispatched.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
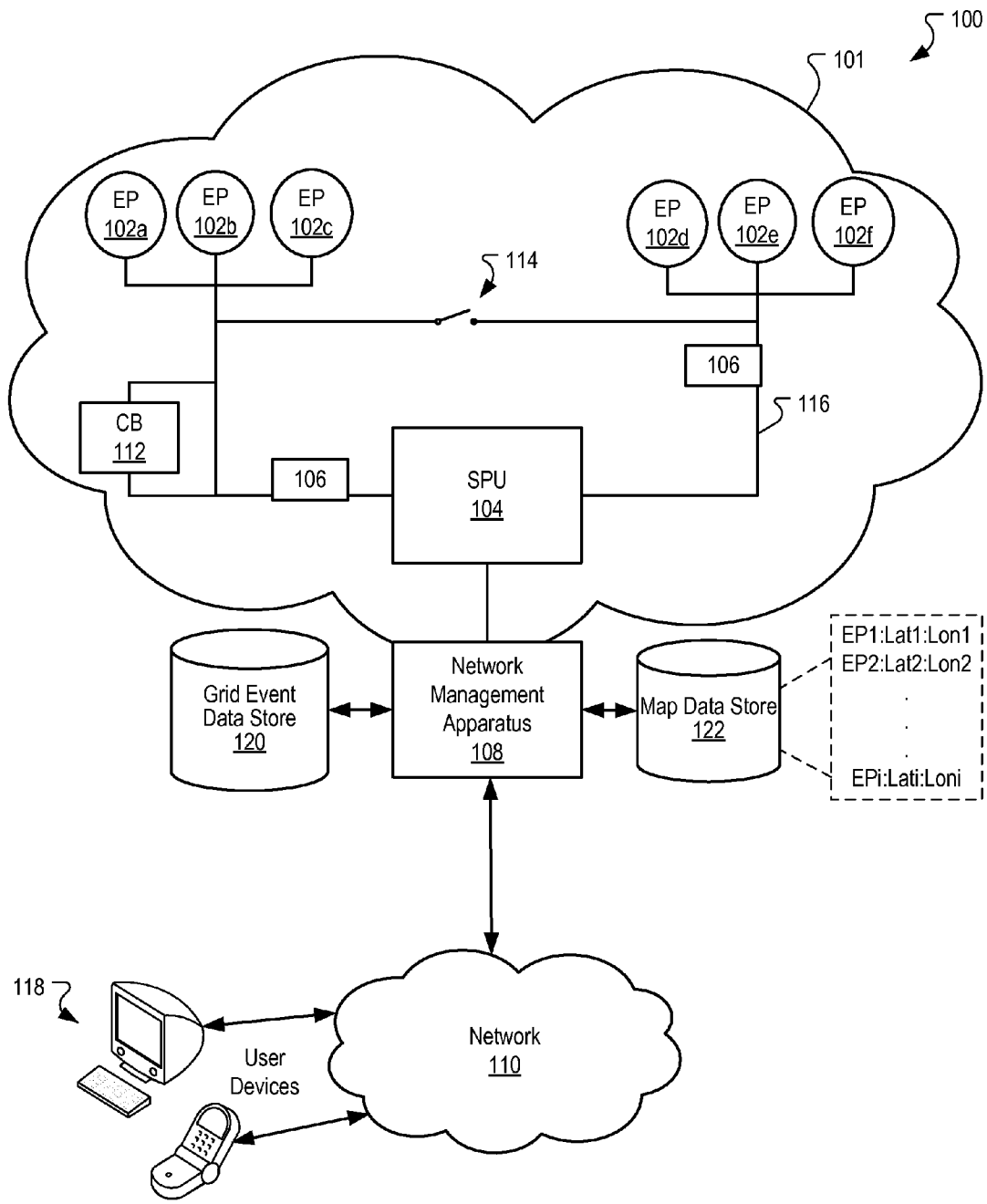
FIG. 1 is a block diagram of an example network environment in which endpoints transmit data.

FIG. 1 is a block diagram of an example network environment 100 in which endpoints transmit data. The network environment 100 includes a service network 101 in which a plurality of endpoints 102a-102f (collectively referred to as endpoints 102) are coupled (e.g., communicatively coupled) to a substation processing unit 104. The endpoints 102 are network elements of the network 101 and can be any device capable of transmitting data in the network environment 100. For example, the endpoints 102 can be meters or other elements of a utility network, computing devices, television set top terminals, or telephones that transmit data in the service network. The description that follows refers to the endpoints 102 as power meters in a power distribution network. However, the description that follows is applicable to other types of endpoints 102 in utility networks or other networks. For example, the description that follows is applicable to gas meters and water meters that are respectively installed in gas and water distribution networks.

The endpoints 102 can be implemented to monitor and report various operating characteristics of the service network 101. For example, in a power distribution network, the endpoints 102 may include meters that can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The end points 102 and the substation 104 communicate with each other over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be implemented in power line communication (PLC) networks that dynamically allocate available bandwidth according to an orthogonal frequency division multiple access (OFDMA) spectrum allocation technique or another channel allocation technique. (e.g., Time Division Multiple Access, Code Division Multiple Access, and other Frequency Division Multiple Access techniques).

When using OFDMA, each endpoint 102 is assigned a subset of available data sub-carriers, such that multiple endpoints can simultaneously transmit data over the service network 101, even when the endpoints 102 have different bandwidth requirements. For example, when a modulation technique being used to transmit data from one endpoint requires more bandwidth than that required by another modulation technique that is being used to transmit data from a second endpoint, the first endpoint can be allocated more sub-carriers (i.e., bandwidth) than the second endpoint. In some implementations, a channel is a set of two or more contiguous sub-carriers, while in some implementations, a channel is a set of any one or more sub-carriers. OFDMA is provided as an example spectrum allocation technique, but other allocation techniques can also be used (e.g., Time Division Multiple Access, Code Division Multiple Access, and other Frequency Division Multiple Access techniques).

OFDMA sub-carriers and/or channels can be allocated in an order that is based on characteristics of the sub-carrier (or channel). For example, the sub-carriers (or channels) can each be ranked according to their respective noise floors (e.g., ranked in ascending order of noise floor). In these implementations, the quietest sub-carriers (i.e., the sub-carriers having the lowest noise floor) are allocated before sub-carriers having higher noise floors. The noise floor of a sub-carrier and/or a channel can be, for example, an average amplitude of noise signals that are measured across the spectrum of the sub-carrier and/or channel. The average amplitude of noise can be the average noise on the channel over a specified period such as a previous hour, day, or week. The noise floor can also be specified as a maximum noise floor, a median noise floor, or another statistical measure of noise across the spectrum of the sub-carrier and/or channel.

When the endpoints 102 are implemented, for example, as power meters in a power distribution network, the data transmitted over the channels by the power meters can represent measures of total power consumption, power consumption over a specified period of time, peak power consumption, instantaneous voltage, peak voltage, minimum voltage and other measures related to power consumption and power management (e.g., load information). Each of the power meters can also transmit status data that specify a status of the power meter (e.g., operating in a normal operating mode or emergency power mode). The data that represent the measures related to power consumption and/or the status of the power meter, as well as other data that are transmitted by the power meters (or other endpoints) are referred to as data that represent meter information.

In some implementations, the data representing the meter information (e.g., data representing measures of power consumption and/or status data) are continuously or intermittently transmitted over a specified unit interval. A unit interval is a period of time over which a particular symbol (i.e., one or more bits) is transmitted. A unit interval for each symbol transmitted by a power meter can be less than or equal to the time interval (i.e., 1/update rate) at which the endpoint 102 is required to provide updated meter information. For example, assume that a particular meter is required to provide updated meter information every 20 minutes (i.e., the specified update rate for the meter). In this example, a meter can transmit a symbol representing a first set of updated meter information for twenty minutes, and then transmit another symbol representing a next set of updated meter information for a subsequent twenty minutes.

The update rate and/or unit interval for a meter can be specified by a network administrator based, for example, on types and amounts of updated meter information that are being received from the meter, preferences of a customer (e.g., a power company) to whom the data is being provided, and/or channel characteristics of the channel over which the data is being transmitted.

The endpoints 102 transmit the data that represent the meter information over the communications channels to a substation processing unit 104. The substation processing unit (SPU) 104 is a data processing apparatus that receives communications from endpoints 102 and uses data included in the communications to manage the service network 101 and/or transmits the data from the communications to another processing apparatus. For example, the SPU 104 can include a receiver that receives symbols 106 from the endpoints 102 and logs data from the symbols. The SPU 104 can also take action based on the data that are included in the symbols 106 that are received from the endpoints 102, or transmit the symbols 106 to a network management apparatus 108 that manages the service network 101. The SPU 104 can transmit the individual symbols 106 or generate a consolidated packet that includes data from multiple symbols 106 received from the endpoints 102.

Other network elements can also communicate with the SPU 104. For example, a capacitor bank ("CB") 112 and a switch 114 can each include communications apparatus that transmit status information to the SPU 104. The status information transmitted by the capacitor bank 112 can include, for example, data specifying whether the capacitor bank 112 is coupled to the network. For example, the SPU 104 may transmit activation instructions (instructions that cause the capacitor to be electrically coupled into the network 101) to the capacitor bank 112. In response to receiving the activation instructions, the capacitor bank 112 can execute instructions that cause the capacitor bank 112 to be activated, such that the capacitor bank is electrically coupled into the network 101. In turn, the capacitor bank 112 can transmit confirmation data indicating that the capacitor bank has been activated. Similar data transmissions can occur when the capacitor bank is to be deactivated.

Similar data communications can also occur between the SPU 104 and other network elements. For example, switching instructions can be transmitted by the SPU 104 to the network switch 114 that can be selectively opened or closed by instructions that are transmitted to the switch 114. In turn, the switch can process the instructions, and transmit confirmation data indicating that the switch has processed the instructions and/or that the switch has been transitioned into a particular configuration state in accordance with the instructions. The configuration state that is reported by a network element is referred to as a reported state of the network element. While receipt of confirmation data specifying the reported state of the network elements is indicative of the network element being configured such that the actual state of the element matches the reported state, it is possible that the confirmation data (i.e., the data that specify the reported state) do not accurately reflect the actual state of the network element.

For example, hardware or software errors at the network element can cause the confirmation data to incorrectly specify the configuration (i.e., the actual state) of the network element. In a particular example, if the switch 114 has a hardware failure that prevents the switch from being closed, it is possible that the switch 114 may have an actual state of open, while transmitting confirmation data specifying a reported state of closed. Similar errors can result in confirmation data that are received from the capacitor bank 112 incorrectly indicating a reported state of activated (or deactivated) for the capacitor bank 112 when the capacitor bank has an actual state of deactivated (or activated).

When network elements malfunction or remain in a state (e.g., open or closed, activated or deactivated, or coupled or decoupled from the network) that differs from the reported state, it may be difficult to successfully transmit a communication over the network 101. For example, assume that the switch 114 remains open after the SPU 104 transmits instructions for the switch 114 to be closed. Further assume that the switch 114 was being closed in response to determining that a power line 116 was cut or that another network element that is connected to the power line 116 has malfunctioned. In this example, transmissions from the endpoints 102d-102f that were being received by the SPU 104 over the power line 116 may not be received by the SPU 104 if the switch is not actually closed. However, it can be difficult to determine that the switch was not actually closed without dispatching a service team to the location of the switch 114, particularly if the confirmation data from the switch indicate that the switch was closed.

The environment 100 includes a network management apparatus 108, which is a data processing apparatus that facilitates grid event detection and provides information and/or instructions that can be used to address the grid event (e.g., end the grid event, adjust network element configurations, or otherwise take action in response to detecting the grid event). In some implementations, the network management apparatus 108 receives signal characteristic data from the SPU 104 and/or directly from endpoints 102. The signal characteristic data specify a set of signal characteristic values of signals that are received over each communications channel ("channel") of the network 101.

For example, the set of signal characteristic values can specify one or more of an amplitude of communications signals that are received over a channel, a noise floor of the channel over which the signals are being received, and/or a signal to noise measure (e.g., $E_b/N_o$) for the signals being received over the channel. The signal characteristic values can also include values such as a peak amplitude, minimum amplitude, maximum amplitude, duty cycle, and/or measures of frequency.

The set of signal characteristic values can include instantaneous measures of signal characteristics and/or signal characteristic values that represent measures of the signal characteristics over time. For example, the signal characteristic values can specify an instantaneous measure of signal amplitude and/or a periodic mean amplitude (or another measure of central tendency for the amplitude).

The network management apparatus 108 can determine, for each channel, whether the signal characteristic values for the channel are outside of a baseline signal value range for the channel. The baseline signal value range is a range of signal values that have been specified (e.g., by a network administrator and/or based on analysis of historical data) as valid values for the signal value characteristics. For example, as described in more detail with reference to FIG. 2A, the baseline signal value range can specify a set of maximum acceptable amplitudes and a set of minimum acceptable amplitudes for the signals that are received over the channel. The baseline signal value range can remain constant over time or can vary over time, and can be based on statistical analysis of the signals that have been previously received over the communications channels.

When the signal characteristic values remain within the baseline signal value range, the network management apparatus 108 can continue to monitor the signal characteristic values. When the network management apparatus 108 determines that the signal characteristic values are outside of the baseline signal value range, the network management apparatus 108 can determine whether the signal characteristic values that were acquired, for example, over a specified period (e.g., one or more previous unit intervals) indicate that a particular grid event has occurred in the network 101. For example, as described with reference to FIG. 3, the network management apparatus 108 can determine whether the signal characteristic values that were received over the specified period match a grid event signature (i.e., a set of signal characteristic values that are indicative of the grid event) that is stored in a grid event data store. If a match is determined to exist, the network management apparatus 108 can determine that the grid event is occurring (or has occurred), and provide data (e.g., to a user device 118 via network 110, or to the SPU 104).

In some implementations, grid event signatures are stored in a grid event data store 120. The grid event store can include a list of grid events and corresponding grid event signatures (i.e., signal characteristic values that are indicative of the grid event) that are associated with (i.e., indexed according to or stored with a reference to) a grid event. The list of grid events can include, for example, a transformer failure, a reclosure failure, capacitor bank activation, a capacitor bank deactivation, a capacitor bank failure, a switch closure, a power outage, and/or other grid events. The grid event signatures that are associated with each of the grid events can be specified on a per-channel basis, such that the signal characteristic values that define a particular grid event can differ on a per-channel basis. Thus, a particular grid event can be identified on each particular channel based on a grid event signature that was specified for that particular channel.

The grid event signatures for each channel can be based, for example, on an analysis of signal characteristic values that were received over the channel during previous occurrences of the grid events. For example, machine learning techniques can be used to select, for each channel, a set of signal characteristic values that are indicative of the occurrence of a grid event based on the signal characteristic values that were received when the grid event was known to be occurring.

In some implementations, the network management apparatus 108 can also determine the locations of endpoints 102 that are being affected by the grid event. For example, as described in more detail with reference to FIG. 4, the network management apparatus 108 can access map data that are stored in a map data store 122 to determine the location of an endpoint that is being affected by the grid event. The map data store 122 can store a set of endpoint identifiers (e.g., EP1-EPi) that uniquely identify each of the endpoints 102 and geographic location information, such as a latitude/longitude pair (e.g., Lat1:Lon1-Lati:Loni), a street address, or distance from a reference geographic location, for each of the endpoints that are identified by the endpoint identifiers.

When the network management apparatus 108 determines that a particular endpoint (e.g., 102e) is being affected by the grid event, the network apparatus 108 can access the map data store 122 to determine the geographic location of the particular endpoint. For example, the network management apparatus 108 can use the endpoint identifier that identifies the particular endpoint to retrieve the geographic location information for the endpoint. As described below with reference to FIG. 4, the network management apparatus 108 can use the geographic location of the particular endpoint to identify additional endpoints that are also likely being affected by the grid event, and determine whether each of the additional endpoints is being affected based on the signal characteristic values for the additional endpoint and the channel-specific (or endpoint-specific) grid event signature (i.e., the grid event signature for the channel over which the endpoint communicates) for the particular grid event.

Figure 2A:
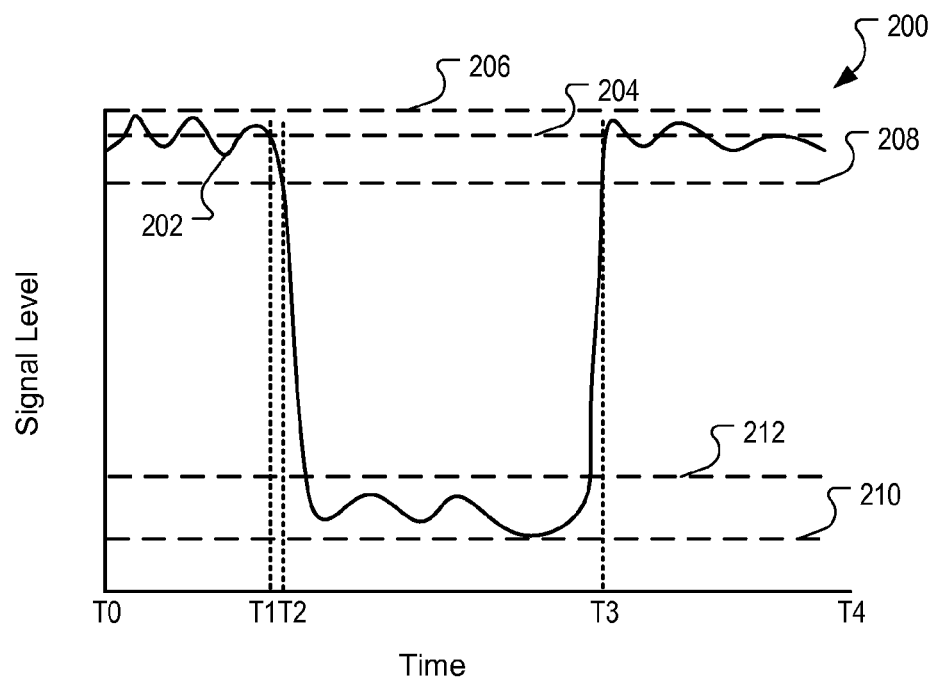
FIG. 2A is a graph illustrating an example signal that can be received over a communications channel.

FIG. 2A is a graph 200 illustrating an example signal 202 that can be received over a communications channel. For purposes of discussion, the graph 200 presents a signal 202 that was received over a single channel from time T0 to time T4 (e.g., one or more unit intervals), and the discussion that follows refers to an event signature that is defined for a single channel based on the signal 202. However, as described above, signals can be received over each channel of a communications network, and event signatures can be defined on a per-channel (or per-endpoint) basis, where each channel can have a different grid event signature for a particular grid event. Thus, multiple signals can be received over multiple channels, and multiple grid event signatures can exist for each particular grid event. Grid events are described below as affecting signals that are received over communications channels. When a grid event affects a signal, the grid event is also considered to have affected the endpoint that transmitted the signal and/or the channel over which the signal is received.

As described above, analysis of the signal 202 (and other signals that were previously received for the channel) can be used to determine a baseline signal value range for the signals that are received over the channel. For example, assume that the historical mean of the signal 202 during reference periods (i.e., when no grid events were occurring) is represented by the line 204. Further assume that the mean maximum signal level (or another statistical measure of amplitude that specifies a measure of maximum signal value) for the signal 202 during the reference periods is represented by the line 206, and the mean minimum signal level (or another statistical measure of amplitude that specifies a measure minimum signal level value) for the signal 202 during the reference periods is represented by the line 208. In this example, the baseline signal value range for signal 202 can be an amplitude range from the amplitude at line 208 to the amplitude at line 206. Thus, while the signal 202 has an amplitude that is between the lines 208 and 206, the signal 202 can be determined to be inside of the baseline signal value range. However, once the signal 202 has an amplitude that exceeds the amplitude at the line 206, or falls below the amplitude at the line 208, the signal is considered to be outside of the baseline signal value range.

As described above, when the signal 202 is determined to be outside of the baseline signal value range, a determination can be made whether the signal characteristic values for the signal 202 match a grid event signature. The grid event signatures for a channel can be defined based on signal characteristic values for signals that were received over the channel during and/or within a threshold time of the occurrence of a grid event. For example, assume that the periods from time T0 to time T1 and from time T3 to T4 represent periods during which no grid events occurred. Further assume that the period time T2 to T3 was a period during which a capacitor bank was known to be activated.

As illustrated in graph 200 the amplitude of the signal 202 dropped (relative to the amplitude during period T0 to T1) when the capacitor bank was activated. However, the amplitude is still non-zero (e.g., relative to the noise floor) and/or above a threshold amplitude value (e.g., as represented by line 210). Thus, while the signal amplitude has dropped, it is unlikely that the endpoint is being affected by a power outage since the amplitude is not substantially zero (e.g., relative to the noise floor). Accordingly, it may be that another grid event (e.g., other than a power outage) is affecting the signals being received from the endpoint.

Analysis of the signals received over the channel during periods when a capacitor bank was active may reveal that the signals remained within an amplitude range that is between the lines 210 and 212, which can define the grid event signature for activation of a capacitor bank. Thus, when the amplitude of the signal falls to an amplitude that is between the lines 210 and 212, it may be determined that the signal is being affected by the capacitor bank activation.

In some implementations, a grid event signature can be defined based on the historical signal characteristic values for the signal 202 when no grid events are occurring and the historical signal characteristic values for signals received over the channel when a particular grid event was occurring. For example, based on the foregoing it may be determined that when a capacitor bank is activated and affects signals that are received over the channel over which signal 202 is transmitted, the signal 202 falls to an amplitude that is below the baseline signal value range (as represented by lines 208 and 206) to the amplitude range between lines 210 and 212. Thus, the amplitudes represented by lines 208, 212, and 210 can be used to define a grid event signature for a capacitor bank activation. Similarly, it may be determined that when the capacitor bank is deactivated, the signal 202 will again return to an amplitude that is between the lines 208 and 206 (assuming no other grid events are affecting the signal 202). Thus, the amplitudes that are represented by lines 212, 208, and 206 can be used to define a grid event signature for a capacitor bank deactivation.

Figure 2B:
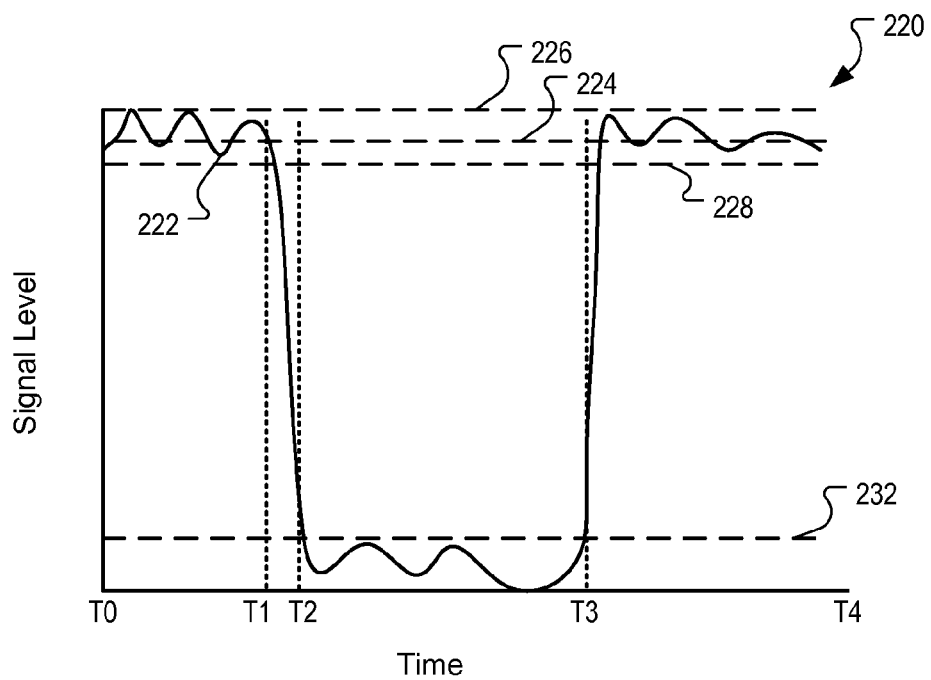
FIG. 2B is a graph of another example signal that can be received over a communications channel.

FIG. 2B is a graph 220 of another example signal 222 that can be received over a communications channel. Based on the discussion above, analysis of historical signal characteristic values for the signal 222 can be used to determine that the mean amplitude of the signal 222 when no grid events are affecting the signal 222 is represented by the line 224, and that the signal is generally (i.e., with a specified statistical measure of likelihood) within an amplitude range that is between the lines 226 and 228. Analysis of the historical signal characteristic values can also reveal that when the signal 222 is affected by a power outage, the signal 222 generally falls below the amplitude represented by the line 232. In some implementations, the amplitude represented by the line 232 is a threshold outage amplitude that is specified based, at least in part, on historical analysis of signal amplitudes during periods in which outages were known to be affecting signals received over the channel or as specified by a network administrator.

Based on the foregoing, the amplitudes represented by the lines 228 and 232 can be used to define a grid event signature for a power outage and/or a power restoration. For example, the grid event signature for a power outage can be defined so that the signal 222 falling below the amplitude represented by the line 228 and the amplitude represented by the line 232 is indicative of the power outage (i.e., matches the grid event signature for the power outage). In this example, a power restoration event signature can be defined so that the signal 222 rising from an amplitude that is below the amplitude represented by the line 232 to an amplitude that is above the amplitude that is represented by the line 228 is indicative of a power restoration (i.e., matches the grid event signature for the power restoration).

Figure 3:
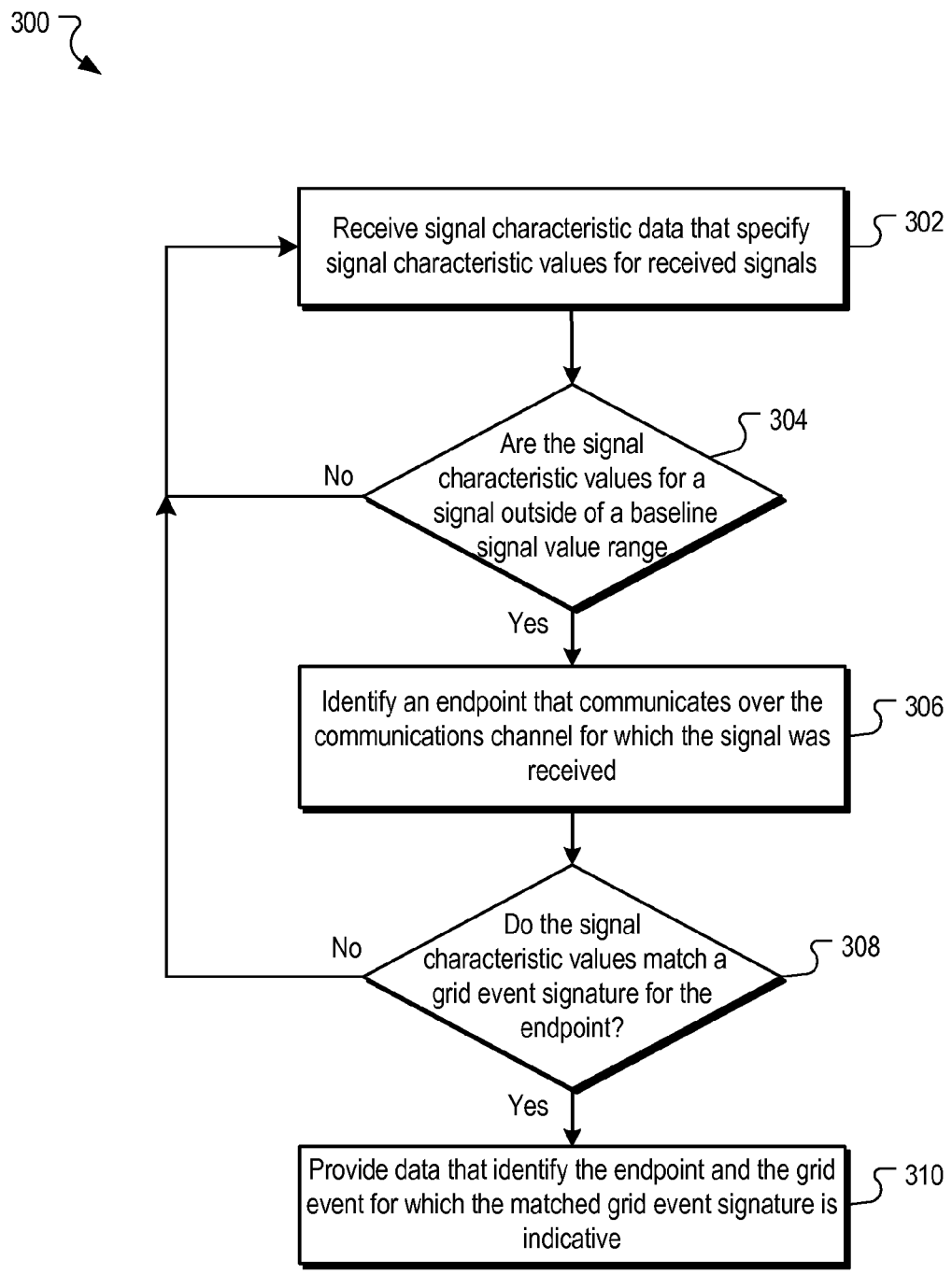
FIG. 3 is a flow chart of an example process for detecting grid events.

FIG. 3 is a flow chart of an example process 300 for detecting grid events. The process 300 is a process by which signal characteristic values for signals that are received over a communications channel are determined to be outside of a baseline signal value range. The endpoint that communicates over the communications channel is identified, and a determination is made that the signal characteristic values match a grid event signature for a particular grid event. In turn, data are provided specifying the endpoint and the particular grid event.

The process 300 can be implemented, for example, by the SPU 104 and/or network management apparatus 108 of FIG. 1. In some implementations, one or more processors are configured to perform actions of the process 300. In other implementations, a computer readable medium can include instructions that when executed by a computer cause the computer to perform actions of the process 300. The process 300 is described with reference to signals (e.g., symbols) that are received over channels of a PLC network, but the process 300 can also be implemented in other communications environments.

Signal characteristic data that specify signal characteristic values are received for signals (302). In some implementations, the signal characteristic values are received for each communications channel over which signals are received. For example, endpoints in a PLC network can transmit symbols over one or more of thousands of communications channels, such that signal characteristic values can be received for thousands of different signals. As described in detail with reference to FIG. 1, the signal characteristic values can include signal amplitude measures, noise floor measures, signal to noise measures, and/or frequency domain measures.

A determination is made whether a signal characteristic value for signals that are received over a communications channel is outside of a baseline signal value range (304). As described with reference to FIGS. 2A and 2B, the baseline signal value range for the signal characteristic value can be a range of values that have been determined to be indicative of a "normal" operating condition (e.g., periods during which operations, such as communications between a SPU and endpoints are not substantially affected by grid events).

The baseline signal value range for a signal amplitude measure can be, for example, a range of values that are defined by a highest acceptable amplitude for the baseline signal value range and a lowest acceptable amplitude for the baseline signal value range. In this example, if the signal amplitude that is specified by the signal characteristic data is between the highest acceptable amplitude and the lowest acceptable amplitude, the signal amplitude (i.e., the signal characteristic value) is considered to be inside of the baseline signal amplitude range. However, if the signal amplitude that is specified by the signal characteristic data is greater than the highest acceptable amplitude or lower than the lowest acceptable amplitude, the signal amplitude (i.e., the signal characteristic value) is considered to be outside of the baseline signal amplitude range.

In response the determining that the signal characteristic value is not outside of the baseline signal value range, signal characteristic data continue to be received (302).

In response to determining that the signal characteristic value is outside of the baseline signal value range, an endpoint that communicates over a channel for which the signal characteristic data were received is identified (306). In some implementations, the endpoint that communicates over the channel is identified using an index (or another data organization structure) that includes a list of endpoint identifiers for endpoints that communicate over channels in the network and communications channels to which each of the endpoints communicates. For example, as described above, each communications channel can be stored at an index location for the endpoint and/or stored with a reference to the endpoint. Thus, the endpoint that communicates over a particular communications channel can be identified by searching the index for a reference to the communications channel, and identifying the endpoint to which the communications channel is indexed.

A determination is made whether a set of the signal characteristic values matches a grid event signature (308). The set of signal characteristic values can include, for example, a set of signal characteristic values for a single signal characteristic (e.g., a set of signal amplitudes), where the set of signal characteristic values includes values that were received over a specified period (e.g., one or more unit intervals). Alternatively, the set of signal characteristic values can specify a set of signal characteristic values for multiple different signal characteristics and/or that were received over a specified period.

The determination of whether the signal characteristic values match a grid event value is made by comparing the set of signal characteristic values to the grid event signature to determine whether a match exists. In some implementations, a match exists when the signal being received has a signal characteristic value (e.g., a signal amplitude) that changes by a threshold amount and/or within a threshold period of time. For example, as described above with reference to FIGS. 2A and 2B, when the signal amplitude of a signal falls below a minimum amplitude of a baseline signal value range and below a threshold value indicative of a power outage, the set of signal characteristic values can be determined to have matched the grid event signature for a power outage. Thus, the endpoint can be determined to be affected by a power outage.

In some implementations, multiple grid event signatures exist, where each of the grid event signatures is indicative of a particular grid event. For example, grid event signatures can exist for each of a capacitor bank failure, a power outage, a capacitor bank activation, and/or other grid events (e.g., a reclosure failure). The set of signal characteristic values can be compared to each of the grid event signatures to determine whether the set of signal characteristic values matches any of the grid event signatures.

In some implementations, the grid event signature for a single grid event can vary on a per-channel and/or per-endpoint basis. For example, different threshold signal characteristic values and/or timing parameters (i.e., time periods between a signal transitioning between two amplitudes of a grid event signature) can be used to define the same grid event for two different communications channels and/or two different endpoints. As described above, each grid event signature can be determined based on statistical (and/or machine learning) analysis of historic signal characteristic values for signals that are received under normal operating conditions and historic signal characteristics for signals that are received during periods in which the endpoint and/or communications channel over which the endpoint communicates was affected by a grid event.

When it is determined that the set of signal characteristic values does not match a grid event signature, signal characteristic data can continue to be received (302).

When it is determined that the set of signal characteristic values does match a grid event signature, data that identify the endpoint and the grid event for which the matched grid event signature is indicative are provided (310). In some implementations, the data can also specify the network element that is contributing to the grid event ("contributing network element"), a geographic location of the contributing network element, and/or an actual state (e.g., open or closed or activated or deactivated) for the contributing network element.

As described in more detail with reference to FIG. 4, the location of a network element that may be the source of the grid event (i.e., the contributing network element) can be identified based on the locations of affected endpoints and/or interconnections between network elements. For example, assuming that the grid event is identified as a switch closure failure, the network configuration can be analyzed to determine the location of a switch that has at least a threshold likelihood of having malfunctioned (e.g., based on the locations of the affected endpoints and electrical interconnections between the affected endpoints).

Status data that were received from the network element may specify a reported state that differs from the actual state of the network element. Continuing with the example above, if the reported state for the switch is open, a determination that the reported state of the network element is inaccurate can be made based on the determination that the signal value characteristics for the affected endpoint are indicative of (i.e., match a grid event signature of) a closed switch. In this example, the data that are provided can specify that the switch may be the cause of the grid event, and/or that the actual state of the network element is closed, and that the actual state differs from the reported state.

Figure 4:
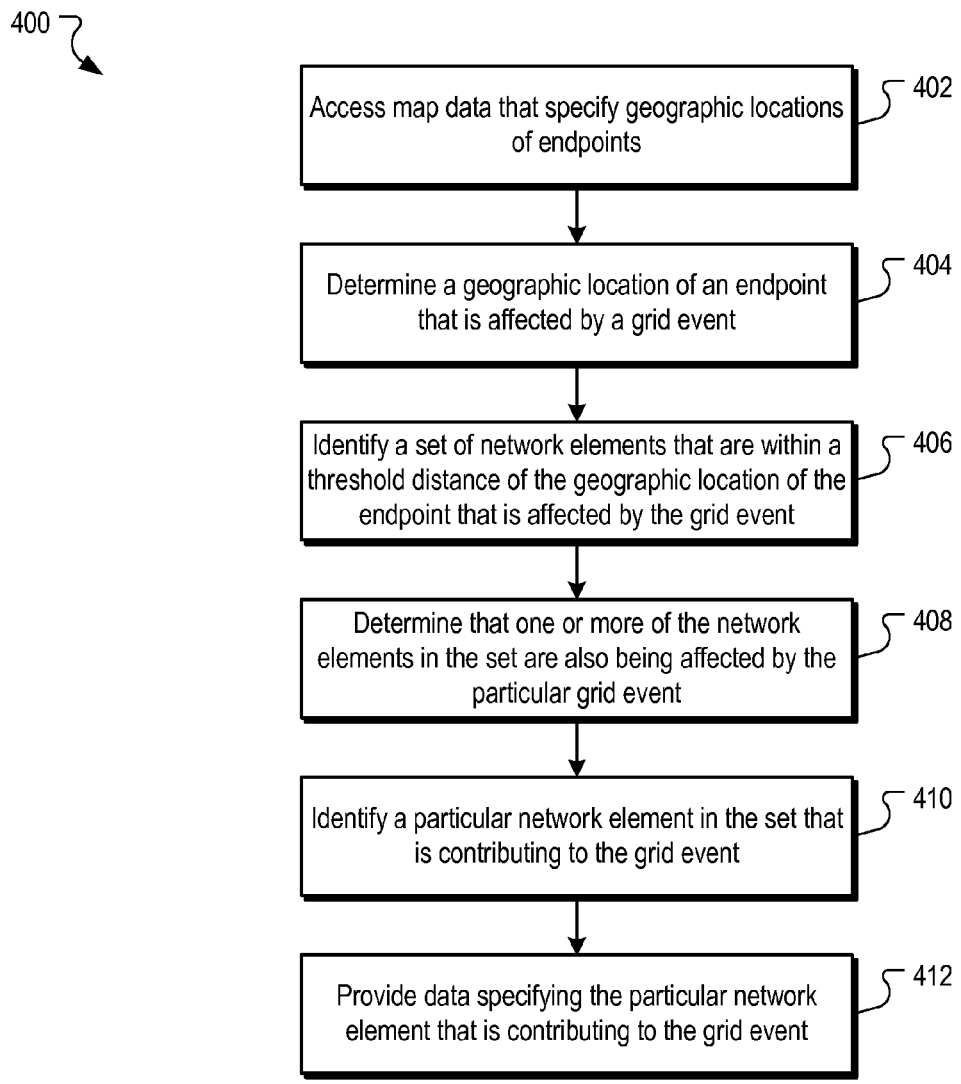
FIG. 4 is a flow chart of an example process for identifying endpoints that are affected by a grid event.

FIG. 4 is a flow chart of an example process 400 for identifying endpoints that are affected by a grid event. The process 400 is a process by which map data that specify geographic locations of endpoints (or other network elements) are used to identify a geographic location of an endpoint that has been determined to be affected by a grid event as well as a set of endpoints that are likely to be affected by the grid event. Signals that are being received from the endpoints in the set of endpoints are analyzed to determine whether the endpoints are also being affected by the grid event. In turn, a particular endpoint in the set (or another endpoint or network element) is identified as the endpoint that is contributing to (e.g., is causing, at least in part) the grid event that is affecting the endpoints. Data specifying the endpoint that is contributing to the grid event is provided, for example, to a user device.

The process 400 can be implemented, for example, by the SPU 104 and/or network management apparatus 108 of FIG. 1. In some implementations, one or more processors are configured to perform actions of the process 400. In other implementations, a computer readable medium can include instructions that when executed by a computer cause the computer to perform actions of the process 400. The process 400 is described with reference to endpoints that are implemented in a PLC network, but the process 400 can also be implemented for other network elements and/or in other communications environments.

Map data that specify geographic locations of endpoints (and other network elements) are accessed (402). In some implementations, the geographic location can be represented by a latitude/longitude pair representing the location at which the endpoint is installed in a power line communications network. For example, the map data can specify geographic coordinates for each meter, each utility pole, each substation, each switch, each transformer, each capacitor bank, as well as other network elements that are installed in the PLC network.

The map data may also specify the configuration of endpoints and other network elements in the PLC network. For example, the map data may include element interconnection data that specify, for an endpoint, each network element to which the endpoint is connected, characteristics of the electrical connection between the network elements (e.g., impedance characteristics of the electrical connection, length of the electrical connection, and/or other characteristics), and locations of utility poles.

In some implementations, the map data can be used to provide data that cause presentation at a user device, of the relative locations of the network elements as well as the electrical and/or physical connections between the network elements. For example, data that cause presentation of a map and icons that represent each network element can be provided to the used device. The data can cause the user device to present the icons for each network element at a map location that represents the geographic location of the network element, and can also cause presentation of text and/or graphics that enable a user to distinguish and/or uniquely identify each of the network elements. The map data can be accessed, for example, from a data store, such as the map data store 122 of FIG. 1.

Using the map data, a geographic location of an endpoint (or another network element) that is affected by a particular grid event is determined (404). In some implementations, the endpoint that is affected by a particular grid event is identified using a process similar to that described with reference to FIG. 3. Alternatively, the endpoint that is affected by a grid event may be reported by a customer or service technician.

In some implementations, the geographic location of the endpoint is identified by searching the map data for a reference to the endpoint identifier for the affected endpoint. For example, if the map data for each endpoint is indexed according to the endpoint identifier for the endpoint, the geographic location of an affected endpoint may be obtained by locating the endpoint identifier for the endpoint, and identifying the geographic location that is indexed to the endpoint identifier for the affected endpoint.

A set of network elements that are within a threshold distance of the geographic location of the affected endpoint are identified (406). In some implementations, the threshold distance can be specified as an absolute distance (e.g., 3 miles) from the affected endpoint or a relative distance from another location. The threshold distance can be specified, for example, by a network administrator and/or based on an analysis of previous grid events and relative locations of the network elements that were affected by the grid event.

In some implementations, the set of network elements that are identified can be restricted based on the configuration of the network elements and the location of the affected endpoint. For example, candidate network elements for the set of network elements (i.e., network elements that are within the threshold distance of the affected endpoint) can be excluded from the set if the candidate network elements are not electrically coupled to the affected endpoint or a same network element as the affected endpoint. For example, if the affected endpoint has been determined to be affected by power outage, a candidate network element that is within the threshold distance of the affected endpoint, but does not receive power from a same substation, over a same set of conductors (i.e., power lines), through the same transformers, or by way of other shared network elements may be excluded from the set of network elements.

A determination can be made that one or more of the network elements in the set are also being affected by the particular grid event (408). In some implementations, the determination can be made based on at least one of the location of the one or more network elements, the location of the affected endpoint, the physical and/or electrical configuration of the one or more network elements and the affected endpoint, and/or the particular grid event. As described above, the configuration (e.g., electrical interconnections) of the network elements can be indicative of the likelihood that particular grid events will affect network elements. For example, the likelihood that network elements that are electrically isolated from each other (e.g., by way of a switch that is actually open, a substation, or another network element that electrically isolates network elements) will both be affected by the same grid event is lower than the likelihood that two network elements that are electrically connected to a same transformer will be affected by the same grid event.

In some implementations, the one or more network elements in the set that are also being affected by the particular grid events are identified using a process similar to that described with reference to FIG. 3. For example, a set of signal characteristic values for each of the network elements in the set can be compared to the grid event signature for the particular event. In turn, the one or more network elements for which the set of signal characteristic values match the grid event signature for the particular grid event are determined to be affected by the particular grid event.

A particular network element from the set that is contributing to the grid event is identified (410). As described above, electrical interconnections between network elements can affect the likelihood that a particular element is the cause (or partial cause) of the grid event (i.e., the contributing network element). For example, network elements that are electrically isolated from the affected endpoint (and/or other affected network elements) are unlikely to be the cause of the grid event that is affecting the affected endpoint.

Similarly, the type of grid event that is affecting the affected endpoint (and/or the other affected network elements) affects the likelihood that particular network elements are the cause of the grid event. For example, if the grid event is determined to be a capacitor bank failure, it is unlikely that a transformer is the contributing network element. Thus, the set of network elements can be filtered to remove network elements that have less than a threshold likelihood of being the contributing network element based on the type of grid event that is being experienced and/or the configuration of the network elements. Filtering the set of network elements results in fewer potential contributing network elements remaining, such that the level of confidence with which the contributing network element is identified is higher relative to the level of confidence with which a network element may be selected from the full set of network elements.

Data that specify the particular endpoint that is contributing to the grid event are provided (412). In some implementations, the data that are provided can also cause presentation of a map interface that visually identifies a geographic location of the contributing network element and/or the grid event to which the network element is contributing. For example, if a particular switch has malfunctioned, as described above, an icon representing a switch can be presented at a map location that represents the geographic location of the switch.

In some implementations, the data also cause a visual indication that the switch is malfunctioning. The visual indication can include highlighting the switch, causing the icon for the switch to flash, or otherwise visually emphasizing the icon for the switch relative to other icons that represent other network elements. The data can also cause icons for the network elements that are being affected by the grid event to be visually emphasized. The visual emphasis of the affected network elements can differ from the visual emphasis of the contributing network element, for example, so that the contributing network element is visually identifiable by a user.

In some implementations, the signal characteristic values that are received from network elements continue to be monitored to determine if additional network elements are being affected by the grid event. In response to determining that additional network elements are being affected by the grid event, the map interface can be updated to visually identify geographic locations of the newly affected network elements.

Figure 5:
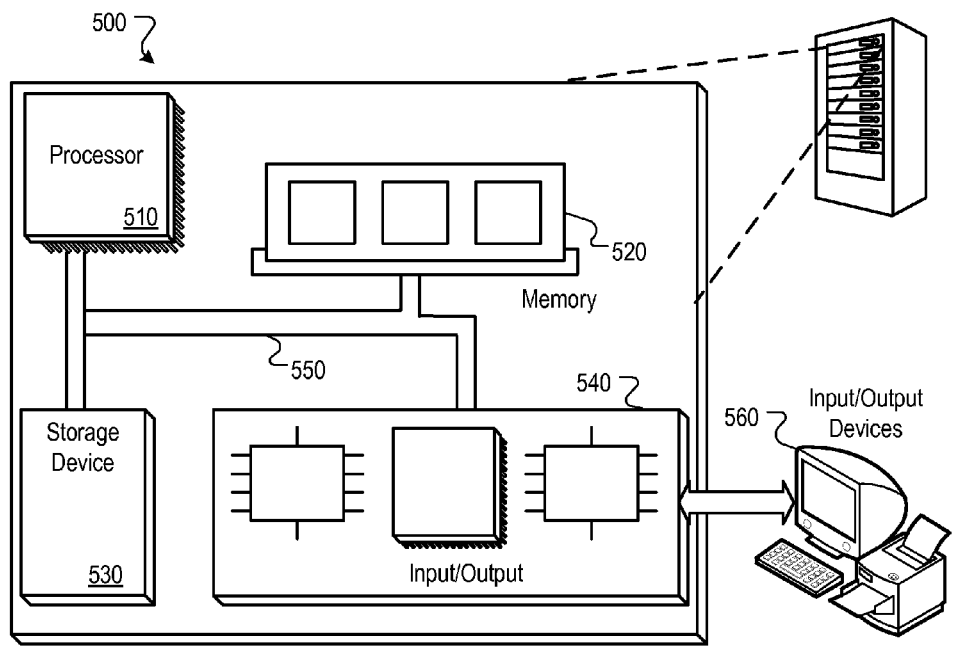
FIG. 5 is a block diagram of an example system that can be used to facilitate grid event detection.

FIG. 5 is a block diagram of an example system 500 that can be used to facilitate grid event detection, as described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, by a data processing apparatus, signal characteristic data that specify signal characteristic values for signals that are received over each of a plurality of communications channels of a power line communications network;
   determining, by the data processing apparatus, that the signal characteristic values for the signals that are received over at least one of the communications channels are outside of a baseline signal value range;
   identifying an endpoint that communicates over the at least one communications channel;
   determining that a set of the signal characteristic values matches one of a plurality of grid event signatures for the identified endpoint, each of the grid event signatures being indicative of a particular grid event corresponding to an impedance change; and
   providing data that identify the endpoint and the particular grid event for the grid event signature that is matched by the set of signal characteristic values.

2. The method of claim 1, wherein determining that the set of signal characteristic values matches one of a plurality of grid event signatures comprises determining that the set of signal characteristic values matches a grid event signature for the impedance change.

3. The method of claim 1, wherein identifying an endpoint that communicates over the communications channel comprises identifying an endpoint identifier for the endpoint that communicates over the communications channel, the endpoint identifier being identified from an index of endpoint identifiers for endpoints and communications channels over which each of the endpoints communicates.

4. The method of claim 1, further comprising:
   accessing map data that specify geographic locations of endpoints; and
   determining a geographic location of the identified endpoint based on the map data.

5. The method of claim 4, further comprising:
   identifying network elements that are within a threshold distance of the geographic location of the identified endpoint; and
   identifying a particular network element in a set of the network elements that is contributing to the grid event, the identification being based on at least one of the location of the identified endpoint, the location of the particular network element, or the particular grid event.

6. The method of claim 5, further comprising determining that one or more additional network elements in the set of network elements are also being affected by the particular grid event.

7. The method of claim 6, wherein determining that one or more additional network elements are also being affected by the particular grid event comprises:
   for each of the one or more additional network elements:
      comparing a set of the signal characteristic values for the network element to the grid event signature for the particular grid event; and
      determining that the set of signal characteristic values match the grid event signature.

8. The method of claim 6, further comprising providing data that cause presentation of a map interface that visually identifies a geographic location of the network element that is contributing to the particular grid event and a geographic location of the one or more additional network elements that are also being affected by the particular grid event.

9. The method of claim 8, further comprising updating the map interface in response to determining a new network element has been determined to be one of the one or more additional network elements, the map interface being updated to visually identify the geographic location of the new network element.

\* \* \* \* \*